United States Patent
Lee

(10) Patent No.: US 7,525,665 B2
(45) Date of Patent: Apr. 28, 2009

(54) POLARISING INTERFEROMETER

(75) Inventor: William Ernest Lee, Bristol (GB)

(73) Assignee: Renishaw PLC, Gloucestershire (GB)

( * ) Notice: Subject to any disclaimer, the term of this patent is extended or adjusted under 35 U.S.C. 154(b) by 173 days.

(21) Appl. No.: 11/587,812

(22) PCT Filed: May 11, 2005

(86) PCT No.: PCT/GB2005/001785

§ 371 (c)(1),
(2), (4) Date: Oct. 27, 2006

(87) PCT Pub. No.: WO2005/108913

PCT Pub. Date: Nov. 17, 2005

(65) Prior Publication Data

US 2007/0223005 A1    Sep. 27, 2007

(30) Foreign Application Priority Data

May 11, 2004 (GB) .................... 0410430.3
Dec. 1, 2004 (GB) .................... 0426351.3

(51) Int. Cl.
*G01B 9/02* (2006.01)
(52) U.S. Cl. .................................. 356/493
(58) Field of Classification Search ........... 356/487, 356/491–493, 496, 498, 508–510
See application file for complete search history.

(56) References Cited

U.S. PATENT DOCUMENTS

| | | | |
|---|---|---|---|
| 4,334,778 A | 6/1982 | Pardue et al. | |
| 4,417,816 A | 11/1983 | Kindl et al. | |
| 4,688,940 A * | 8/1987 | Sommargren et al. | 356/487 |
| 4,711,574 A | 12/1987 | Baldwin | |
| 4,784,490 A | 11/1988 | Wayne | |
| 5,757,491 A * | 5/1998 | Cai et al. | 356/508 |
| 5,764,361 A | 6/1998 | Kato et al. | |
| 5,784,161 A * | 7/1998 | Bechstein et al. | 356/487 |
| 6,483,593 B1 * | 11/2002 | Bell et al. | 356/487 |
| 6,778,280 B2 * | 8/2004 | De Groot et al. | 356/493 |
| 6,806,962 B2 * | 10/2004 | Hill | 356/493 |
| 6,819,434 B2 * | 11/2004 | Hill | 356/493 |

(Continued)

FOREIGN PATENT DOCUMENTS

JP    A 2003-42710    2/2003

OTHER PUBLICATIONS

S.J. Bennett, "A Double-Passed Michelson Interferometer," Optics Communications, vol. 4, No. 6, pp. 428-430, Feb./Mar. 1972.

(Continued)

*Primary Examiner*—Patrick J Connolly
*Assistant Examiner*—Scott M Richey
(74) *Attorney, Agent, or Firm*—Oliff & Berridge, PLC

(57) ABSTRACT

A polarising double-passed interferometer comprises a polarising beamsplitter (16), a reference mirror (20) in the path of a reference beam (14) and a movable measurement mirror (26) in the path of a measurement beam (12). The reference and measurement beams have different polarisations. An angular beam deflection device such a glass wedge or prism (32) acts to remove or separate out an error beam (30) caused by leakage of light of one polarisation into the path of light of the other polarisation.

16 Claims, 4 Drawing Sheets

U.S. PATENT DOCUMENTS

| | | | |
|---|---|---|---|
| 6,882,430 B2 * | 4/2005 | Hill | 356/496 |
| 6,906,784 B2 * | 6/2005 | Hill | 355/53 |
| 7,310,152 B2 * | 12/2007 | Carlson | 356/493 |
| 7,330,267 B1 * | 2/2008 | Weitzel | 356/456 |
| 7,342,641 B2 * | 3/2008 | Sogard | 355/55 |
| 2003/0007156 A1 | 1/2003 | De Groot et al. | |
| 2003/0038947 A1 | 2/2003 | Hill | |
| 2003/0164948 A1 | 9/2003 | Hill | |
| 2008/0111994 A1 * | 5/2008 | Sogard | 356/498 |

OTHER PUBLICATIONS

Zygo Corp., "Differential Plane Interferometer," (Publication Date Unknown).

* cited by examiner

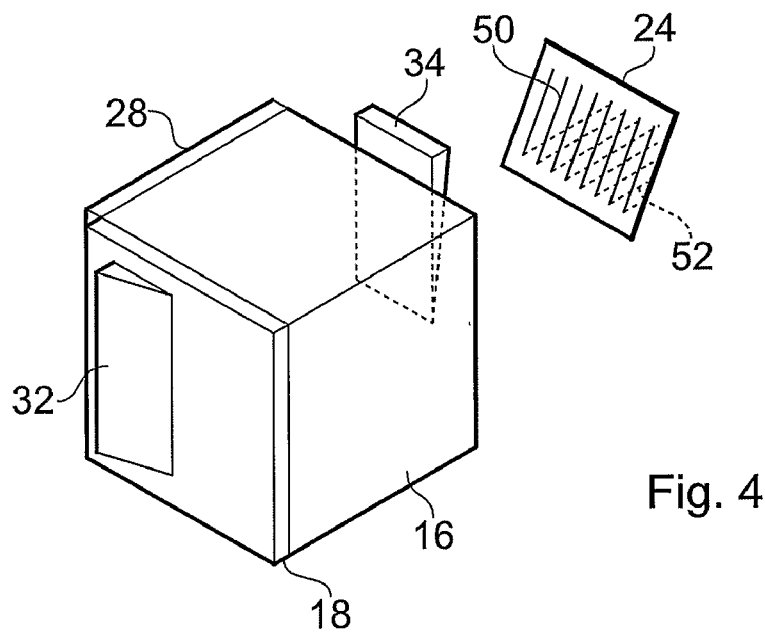
Fig. 4
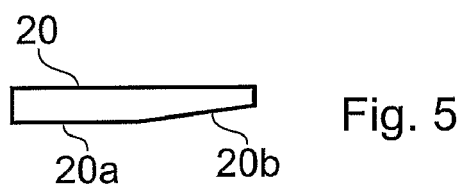
Fig. 5
Fig. 7
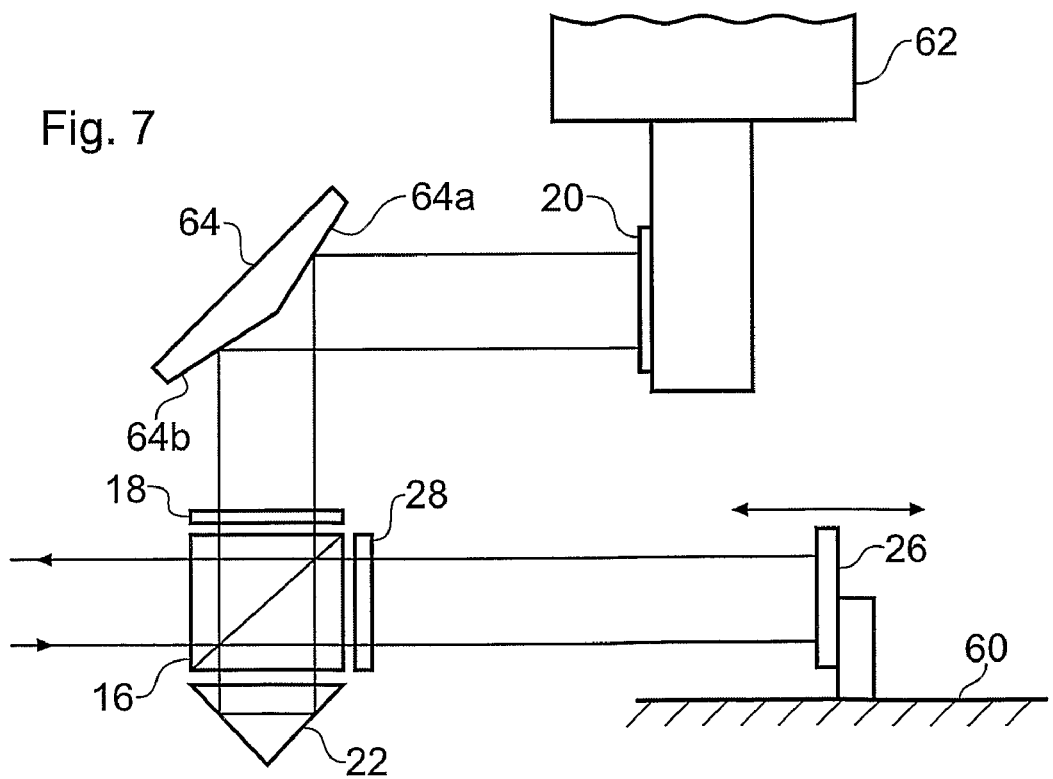

POLARISING INTERFEROMETER

This invention relates to interferometers, such as those used for length, distance or angular measurements.

Polarising plane mirror interferometers are known from "A Double-Passed Michelson Interferometer", S J Bennett, Optics Communications, Vol 4, No. 6, February/March 1972, pages 428-430, and from U.S. Pat. No. 4,784,490 (Wayne). FIG. 1 of the accompanying drawings shows such a known arrangement.

In FIG. 1, coherent light from a laser light source 10 is split into two orthogonally polarised beams 12,14 by a polarising beamsplitter 16. (For clarity, the two orthogonally polarised components are shown as if they were slightly separated between the source 10 and the beamsplitter 16, though in reality they would be superimposed.)

The beam 14 is a reference beam which is directed by the beamsplitter 16 to a reference mirror 20. Between the beamsplitter 16 and the reference mirror 20 is a quarter-wave plate 18 and since the beam 14 makes two passes through this its polarisation state is rotated through 90° when it returns to the beamsplitter 16. It is now transmitted straight through the beamsplitter to a cube corner retroreflector 22, which returns it for another pass through the beamsplitter 16 and quarter-wave plate 18 to the reference mirror 20. When it returns again to the beamsplitter, its polarisation is again rotated through 90° so that it is reflected to a detector 24.

The other polarised component 12 forms a measuring beam. In a similar manner, it is passed twice to a moving mirror 26, attached to an object whose position or movement is to be measured. As it passes to and from the mirror 26, it passes twice through a second quarter-wave plate 28, so as to rotate its plane of polarisation through 90°. Again, this results in the beam passing to the cube corner retroreflector 22 and for a second pass to the mirror 26, before being transmitted back to the detector 24. In the detector 24, the measurement and reference beams interfere, producing fringes which can be counted in known manner to determine the movement of the mirror 26.

The double passage of the measurement and reference beams to each mirror and through similar optical components renders the system relatively immune to misalignment of the mirrors 20,26 and to thermal instability over a period of time.

Polarising interferometers are also known in which a single quarter-wave plate is used in order to provide a double pass to the measurement mirror but not the reference mirror. Furthermore, heterodyne interferometers are known, in which the measurement and reference beams are orthogonally polarised and also have slightly different frequencies. See for example U.S. Pat. No. 4,688,940 (Sommargren et al). The present invention is also applicable to these different types of polarising interferometers.

The present inventor has observed a problem in practice, in that leakage may take place of light of one polarisation into the path of the light of the other polarisation. This can happen because of imperfections in the performance of the beamsplitter and/or retroreflector. In practice, a polarising beamsplitter has a finite extinction ratio, so that while most of the light of one given polarisation is reflected a small percentage is transmitted, and vice versa for the other polarisation. In the case of the retroreflector, in practice it can slightly rotate the plane of polarisation of linearly polarised light, and make the beam slightly elliptically polarised.

This leakage is illustrated in FIG. 2, which shows a similar arrangement to FIG. 1 (except that the reference and measurement mirrors 20,26 have been transposed). For clarity, only the measurement beam 12 has been shown, and not the reference beam 14. Other elements have been given the same reference numbers as in FIG. 1. An error beam 30 is shown in broken lines. This error beam is produced by leakage of polarised light en route from the retroreflector 22 towards the measurement mirror 26 for the second time. Because of the problems mentioned above, a small proportion of this light is incorrectly deflected by the beamsplitter 16 towards the reference mirror 20. It is then reflected back on the same path as the output beam towards the detector 24.

The result of such leakage of light of the wrong polarisation from the reference arm of the interferometer to the measurement arm, or vice versa, is a degradation in the resulting interference fringes. In particular, it can degrade the sinusoidal shape of the fringes with the result that if an interpolator is used to sub-divide the fringe count, it will suffer from sub-divisional error (SDE) i.e. the sub-divisions will not be equally spaced within one cycle of the waveform.

A further problem which may arise is illustrated in FIG. 8, in relation to a polarising plane mirror interferometer with a single quarter-wave plate 28 in the measuring beam 12. In place of the plane reference mirror 20, a retroreflector 21 is provided. Other components are similar to those shown in FIG. 2 and have been given the same reference numbers.

In such a plane mirror interferometer, the polarising beamsplitter and the quarter-wave plate should in theory act as an optical isolator to stop light returning to the source 10 (which in practice is a laser tube). However, imperfections in the polarising beamsplitter and wave plate performance cause light to be leaked back towards the laser tube, as an error beam shown by a broken line 31.

When setting up the system, the user would normally align the system to maximise the signal strength, aligning the measurement mirror 26 so that it is normal to the laser beam. This causes the leaked laser light to return anti-parallel with the output beam. Therefore, when the mirror is aligned to maximise signal strength, the leaked light will return directly into the laser tube. This degrades the frequency stability of the laser.

In some systems, the source 10 and detector 24 may be coupled to the polarising beamsplitter 16 via optical fibres. In such systems too the leaked light will be re-coupled back into the delivery fibre, which routes it back towards the laser and again the frequency stability is degraded.

One solution to this problem would be to angularly offset (i.e. misalign) the measurement mirror 26 so that the measurement beam is angularly displaced when it returns into the rest of the interferometer optics. The position of the retroreflector 22 may be offset to partially compensate for this. However, angularly offsetting the mirror means that the signal strength will be reduced and will vary along the measurement axis. The longer the axis, the more signal strength variation will occur. Consequently, there is a reduction in the measurement range of the interferometer (i.e. the permissible distance over which movement of the mirror 26 can be measured).

The present invention provides an interferometer comprising:
   a light source;
   a polarising beamsplitter arranged to receive light from the light source and split it into a measurement beam and a reference beam having different polarisations; and
   a detector which reacts to interference of light from the reference beam and the measurement beam;
characterised by means for removing or separating out an error beam caused by leakage of light from one of said measurement and reference beams into the other of said measurement and reference beams, or back towards the light source.

Preferred embodiments of the invention will now be described with reference to the accompanying drawings, wherein:

FIG. 4 is a diagrammatic isometric view of some of the components of a modification of the embodiment of FIG. 3;

FIG. 5 shows a mirror for use in a further modification of the embodiment of FIG. 3;

FIG. 7 shows an interferometer arrangement according to a third embodiment of the invention;

FIG. 3 shows a similar arrangement to FIG. 2, and again the same reference numerals have been used for similar components. Though not shown, the source and detector are at the same positions as in FIG. 2, and again the reference beam has been omitted for clarity.

Figure 3:
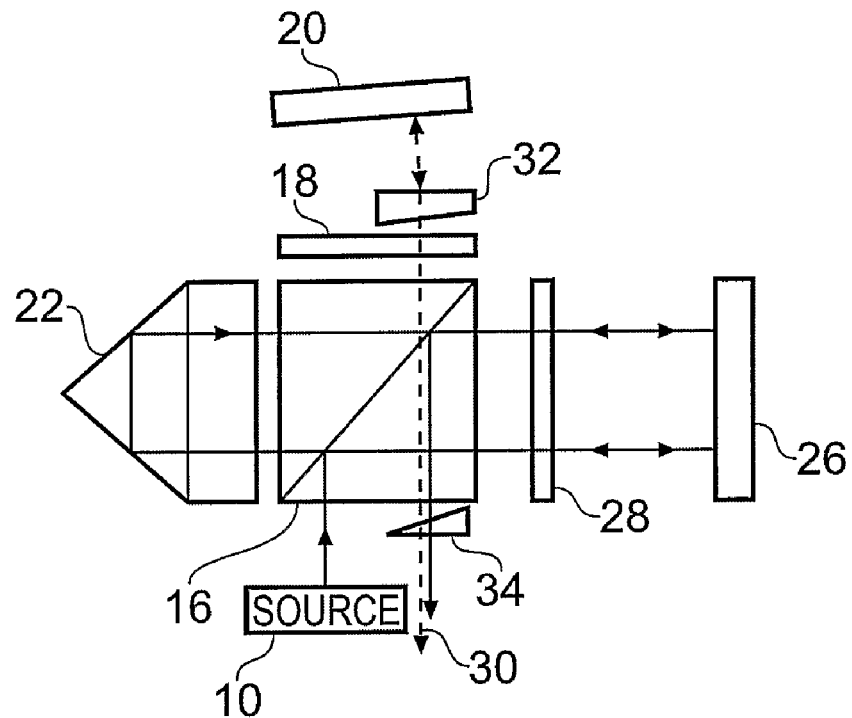
FIG. 3 shows an interferometer arrangement according to a first embodiment of the invention.

In order to separate the error beam 30 from the main beams of the measurement and reference arms returning to the detector, the embodiment of FIG. 3 provides a glass wedge or prism 32 in between the quarter-wave plate 18 and the reference mirror 20. This angularly deflects the reference beam on one of its two passes to and from the reference mirror. Thus, when the user aligns the reference mirror so as to optimise the signal strength at the detector, it will not be normal to the beams, but will be slightly angularly offset as shown. As a result, as the reference beam exits the beamsplitter 18 towards the detector, it will be at a slight angle to the measurement beam.

If required for detection purposes, the reference and measurement beams may be brought parallel again by a birefringent wedge 34. Alternatively, however, many homodyne detection schemes can internally compensate for this angular deviation between the beams, for example in cases where a spatial fringe pattern is produced transverse to the direction of the beams and detected by a detector having a corresponding grating structure. Even in such a case, the birefringent wedge 34 can be included, to assist in setting the pitch of the spatial fringes.

Figure 1:
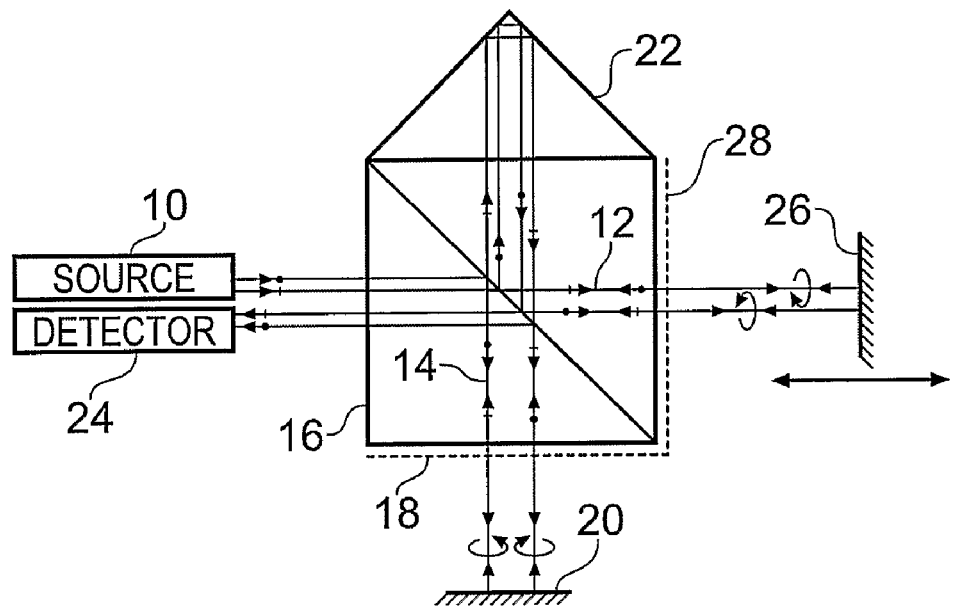
FIG. 1 shows a prior art interferometer arrangement.
Figure 2:
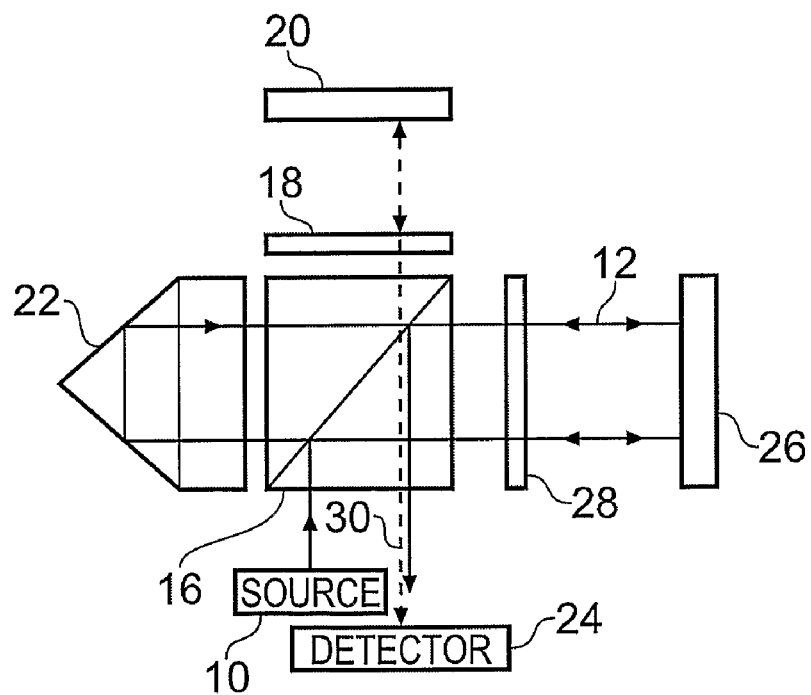
FIG. 2 shows a similar arrangement, illustrating a light leakage problem.

Importantly, the glass wedge or prism 32 also has the effect of angularly deflecting the error beam 30, as compared with FIG. 2. This deflection is rather greater than the deflection discussed above between the reference and measurement beams at the detector, since the error beam does not double pass the mirror 20. In consequence, the error beam can be arranged to miss the detector entirely. Alternatively, it can be arranged not to cause unwanted distortion to the fringe pattern produced by interference between the measurement and reference beams. That can be ensured, in the case of a transverse spatial fringe pattern detected by a grating structure, by arranging that the fringes caused by the error beam are of a pitch which is averaged out across the grating structure of the detector.

In FIG. 3, the reference mirror 20 and the wedge 32 are shown oriented such that they deviate the beams through an angle which lies within the plane of the paper. However, either or both could be arranged to produce such an angular beam deviation out of the plane of the paper, e.g. orthogonal to the plane of the paper.

The birefringent wedge 34 can be arranged to produce an angular beam deviation in a different plane to that produced by the wedge 32, e.g. orthogonal to it. In the case where the detector detects transverse spatial fringes, with a pitch determined by the birefringent wedge 34, this will result in a rotation of the fringes in the plane of the detector, and so the grating structure is rotated to match. This is illustrated in FIG. 4, where the mirrors and retroreflector have been omitted for clarity, and the prism 34 is arranged orthogonally to the wedge 32. The detector 24 has been rotated to match the fringes 50 produced by interference of the reference and measurement beams. The fringes 52 caused by the error beam 30 now not only have a different pitch to the grating structure, but are rotated to a different angle relative to the grating structure, further reducing their effect.

Indeed, the wedge 34 can be arranged at an angle to cause such a rotation of the error fringes even if it is not birefringent.

The glass wedge 32 is shown in FIG. 3 between the quarter-wave plate 18 and the reference mirror 20.

Marginally improved polarisation control may be obtained if it is instead located between the quarter-wave plate 18 and the beamsplitter 16. However, this makes it harder to cement the components 16,18,22,28,32 into a single interferometer head.

Rather than using the wedge 32, it is possible to modify the reference mirror 20 as shown in FIG. 5, so that it has two mirror faces 20a,20b in two planes slightly angularly offset from each other.

Figure 6:
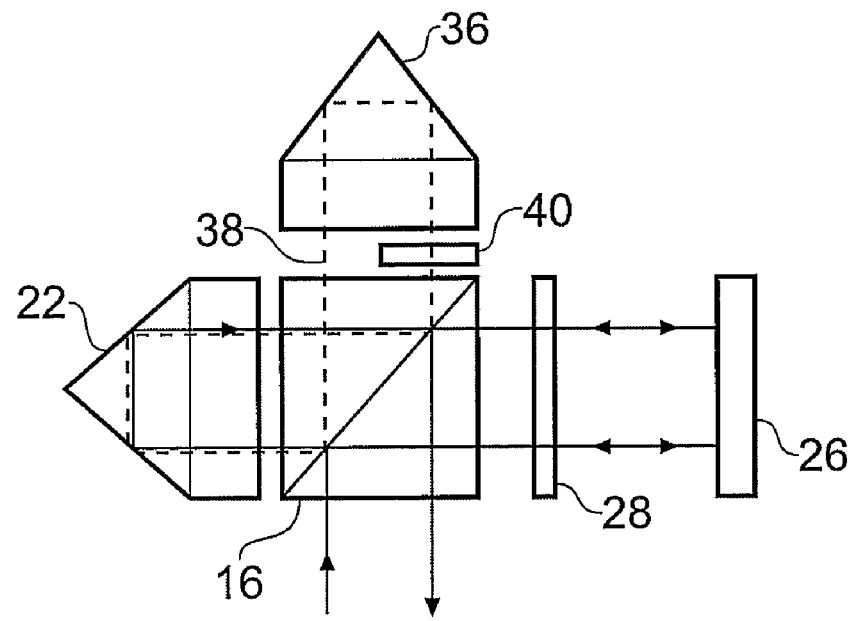
FIG. 6 shows an interferometer arrangement according to a second embodiment of the invention.

FIG. 6 shows an embodiment which corresponds to FIG. 3, and again the reference beam has been omitted for clarity. It differs from FIG. 3 in that it uses only a single quarter-wave plate 28, in the measurement beam, with none in the reference beam. Instead of a plane reference mirror 20, it uses a reference retroreflector 36. Such an arrangement has a similar polarisation leakage problem. The leaked light may form a cavity between the two retroreflectors 22,36, as shown by broken lines 38.

To avoid this effect, an additional polarising optic e.g. a polarising filter 40 is inserted so as to preferentially attenuate the unwanted cavity beam 38. Alternatively, the effect may be removed by a glass wedge at the same position, as in FIG. 3. Where a polarising filter is used, it may if desired spread across the full width of the retroreflector 36, rather than merely across part of it as shown.

FIG. 7 illustrates a further embodiment, used in a "column reference" application to measure the movement of a mirror 26 on a bed 60 of a machine relative to a reference mirror 20 on a relatively stationary column 62 of the machine. A turning mirror 64 above the beamsplitter 16 provides a periscope arrangement to direct light to and from the mirror 20. This turning mirror 64 has two angularly offset faces 64a,64b, similar to the mirror 20 in FIG. 5, which act to separate the error beam as previously. A glass wedge 34 could of course be used instead, in conjunction with a plane turning mirror, or the reference mirror 20 could have the two angularly offset faces, as in FIG. 5.

Thus, it will be seen that in the above embodiments of FIGS. 3 to 7 the glass wedge 32 or polarising filter 40 or mirror faces 20a,20b or 64a,64b remove or separate the error beam caused by polarisation leakage. It is preferred to place these components in the path of the reference beam, as described, but placing them in the measurement beam is not excluded.

The invention is not restricted to the embodiments described, and similar arrangements to remove such error beams may be used in polarising interferometers using retroreflectors for both the reference and measurement beams, instead of the plane mirrors 20,26. It may also be used in heterodyne interferometers where the differently polarised measurement and reference beams have different frequencies.

Figure 8:
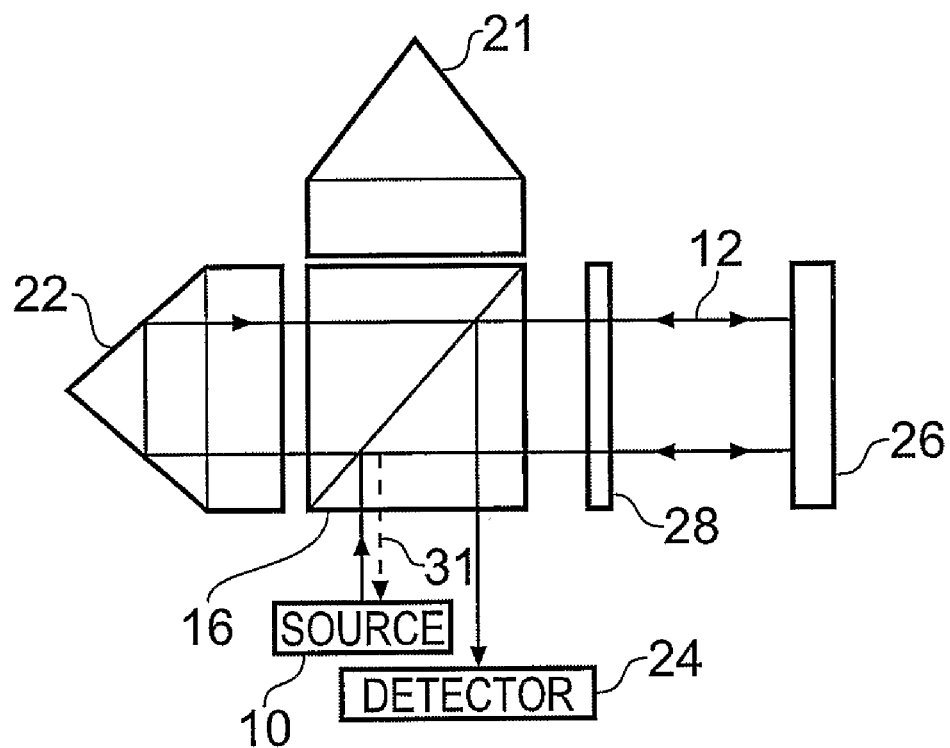
FIG. 8 illustrates a light leakage problem in a further interferometer arrangement.
Figure 9:
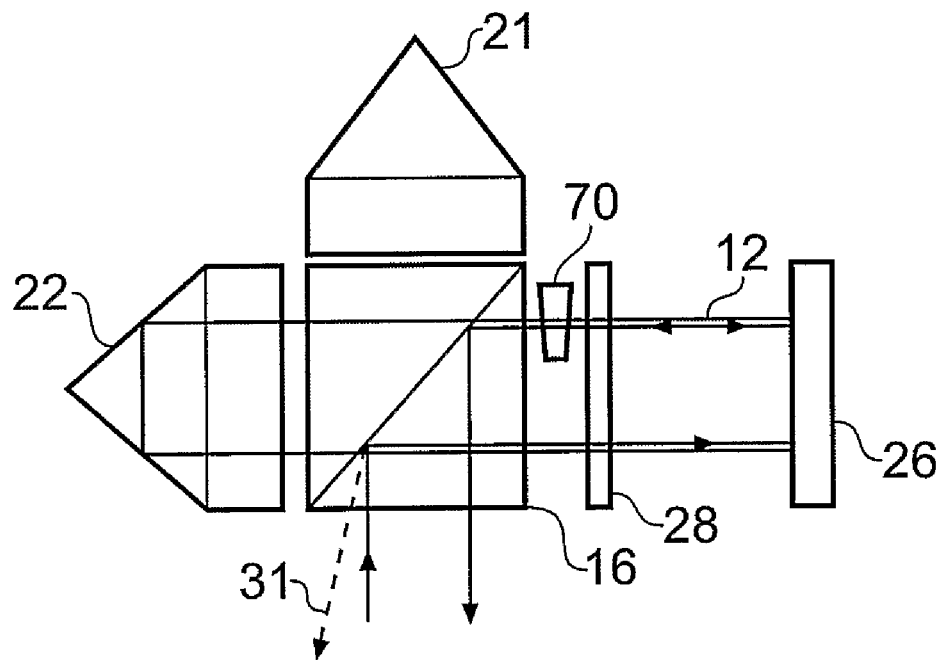
FIG. 9 shows an interferometer arrangement according to a fourth embodiment of the invention.

FIG. 9 illustrates a further embodiment of the invention, which ameliorates the problem discussed above in respect of FIG. 8. Here, a glass wedge or prism 70 is placed between the beamsplitter 16 and the quarter-wave plate 28. This angularly deflects the measurement beam on one of its two passes to the measurement mirror 26. When setting up the system, the user will align the mirror 26 with a slight angular offset in order to compensate for this and optimise the signal strength. As a result, the mirror will not be quite normal to the measurement beams. The leaked error beam 31 is no longer parallel with the input beam from the laser source, as can be seen by a comparison of FIG. 8 with FIG. 9.

In a non-fibre coupled interferometer, the leaked error beam 31 will no longer return towards the laser tube. In a fibre coupled system, the leaked light will not be coupled back into the fibre. In both cases, the leakage of light will not cause destabilisation of the laser.

The wedge or prism 70 has the side-effect of making the measurement and reference beams returning into the detector optics angularly offset from each other. This may be compensated for in the same manner as the embodiments above, e.g. with a birefringent wedge 34 as in FIGS. 3 and 4, or merely by internal compensation within a homodyne detector.

With the arrangement of FIG. 9, when aligned to maximise signal strength in the far field, the signal strength will remain almost constant along a much greater range of movement of the mirror 26, compared to the prior art arrangement of FIG. 8.

The invevtion claimed is:

1. An interferometer comprising:
    a light source;
    a measurement arm;
    a reference arm;
    a polarising beamsplitter arranged to receive light from the light source and split the light into a measurement beam and a reference beam having different polarizations, the measurement beam and the reference beam passing around the measurement arm and reference arm, respectively, and returning to the beamsplitter; and
    a detector that receives the measurement beam and the reference beam from the beamsplitter and that reacts to interference of light from the reference beam and the measurement beam; and
    a device that at least one of removes and separates out an error beam, said error beam caused by leakage of light from one of said measurement and reference beams into the other of said measurement and reference beams, or by leakage of light back towards the light source;
    wherein the device that at least one of removes and separates said error beam is provided in the measurement arm or reference arm.

2. The interferometer according to claim 1, wherein said leakage of light from one of said measurement and reference beams into the other of said measurement and reference beams has a different polarisation thereto.

3. The interferometer according to claim 1, further comprising:
    a quarter-wave plate in the measurement arm or the reference arm, wherein on the condition that the quarter-wave plate is in the measurement arm, the measurement beam passes twice through the quarter-wave plate, and on the condition that the quarter-wave plate is in the reference arm, the reference beam passes twice through the quarter-wave plate.

4. The interferometer according to claim 1, further comprising:
    a first quarter-wave plate in the measurement arms; and
    a second quarter-wave plate in the reference arm,
    wherein the measurement beam passes twice through the first quarter-wave plate and the reference beam passes twice through the second quarter-wave plate.

5. The interferometer according to claim 1, wherein the device that at least one of removes and separates out the error beam comprises a first angular beam deflection device in one of said measurement arm and said reference arm that angularly deflects said error beam.

6. The interferometer according to claim 5, wherein the angular beam deflection device comprises a wedge or prism.

7. The interferometer according to claim 5, including a second angular beam deflection device in a combined path of the beams, between the beamsplitter and the detector.

8. The interferometer according to claim 7, wherein the second angular beam deflection device is birefringent.

9. The interferometer according to claim 7, wherein the first angular beam deflection device and the second angular beam deflection device produce deflections in different planes, thereby resulting in a rotation of spatial fringes produced at the detector, the fringes caused by the error beam being rotated to a different angle.

10. The interferometer according to claim 1, wherein the device that at least one of removes and separates out the error beam comprises a polarising optic in one of said measurement arm and said reference arm.

11. The interferometer according to claim 1, wherein the device that at least one of removes and separates out the error beam comprises a mirror in one of the measurement arm and the reference arm, the mirror having two angularly offset mirror faces.

12. An interferometer comprising:
    a light source;
    a measurement arm;
    a reference arm;
    a polarizing beamsplitter arranged to receive light from the light source and split the light into a measurement beam and a reference beam having different polarizations, the measurement beam and the reference beam passing around the measurement arm and reference arm, respectively, and returning to the beamsplitter;
    a detector that receives the measurement beam and the reference beam from the beamsplitter and that reacts to interference of light from the reference beam and the measurement beam; and
    a beam separation device that separates out an error beam, said error beam caused by leakage of light from one of said measurement beam and said reference beam into the other of said measurement beam and said reference beam, or by leakage of light back towards the light source;
    wherein the beam separation device is provided in the measurement arm or reference arm.

13. The interferometer according to claim 12, wherein the beam separation device comprises an angular beam deflection device.

14. The interferometer according to claim 13, wherein the angular beam deflection device comprises a wedge or prism.

15. The interferometer according to claim 12, wherein the beam separation device separates out the error beam by deflecting the error beam such that the error beam passes the detector without being received by the detector.

16. An interferometer comprising:
- a light source;
- a measurement arm;
- a reference arm;
- a polarising beamsplitter arranged to receive light from the light source and split the light into a measurement beam and a reference beam having different polarizations, the measurement beam and the reference beam passing around the measurement arm and reference arm, respectively, and returning to the beamsplitter; and
- a detector that receives the measurement beam and the reference beam from the beamsplitter, the detector including a grating structure that detects a spatial fringe pattern produced by interference between the reference beam and the measurement beam; and
- a device that at least one of removes and separates out an error beam, the device deflecting the error beam such that the error beam produces a fringe pattern having a pitch that is averaged out across the grating structure of the deflector;
- wherein the device that at least one of removes and separates said error beam is provided in the measurement arm or reference arm.

* * * * *